United States Patent [19]

Serebryakova et al.

[11] 3,761,497

[45] Sept. 25, 1973

[54] METHOD OF PRODUCING RACEMIC ESTRADIOL-3,17β

[76] Inventors: Tatyana Andreevna Serebryakova, ulitsa Mosfilmovskaya, 41, kv. 58; Ardalion Vladimirovich Zakharychev, ulitsa Zatonnaya, 9, korpus 5, kv. 77; Margarita Alexandrovna Nekrasova, ulitsa Junnatov, 15, korpus B, kv. 10; Sofya Nikolaevna Ananchenko, Leninsky prospekt, 40, kv. 36; Igor Vladimirovich Torgov, ulitsa Obrucheva, 16, kv. 34, all of Moscow, U.S.S.R.

[22] Filed: Apr. 23, 1971

[21] Appl. No.: 137,090

[52] U.S. Cl......... 260/397.5, 260/397.45, 260/590, 260/621
[51] Int. Cl........................................... C07c 169/08
[58] Field of Search ...... Machine Searched Steroids

[56] References Cited
UNITED STATES PATENTS

| 3,318,922 | 5/1967 | Windholz et al. | 260/397.4 |
| 3,472,881 | 10/1969 | Kuo et al. | 260/397.1 |
| 3,501,509 | 3/1970 | Kuo et al. | 260/397.5 |

*Primary Examiner*—Henry A. French
*Attorney*—Waters, Roditi, Schwartz & Nissen

[57] ABSTRACT

A method of producing racemic estradiol-3,17β wherein 6-methoxytetralone is demethylated by hydrobromic acid in the medium of acetic acid while boiling, the resultant 6-hydroxytetralone is reacted with vinylmagnesiumbromide to form into 1-vinyl-1,2,3,4-tetrahydronaphthalene-1,6-diol which is condensed with 2-methylcyclopentane-1,3-dione; the thus-obtained $\Delta^{1,3,5(10),9(11)}$-8,14-seco-estratetraen-3-ol-14,17-dione is subjected to cyclization, the resulting $\Delta^{1,3,5(10),8(9),14(15)}$-estrapentaen-3-ol-17-one is hydrogenated into $\Delta^{1,3,5(10),8(9)}$-estratetraen-3-ol-17-one then reduced by sodiumborohydride and the thus-produced $\Delta^{1,3,5(10),8(9)}$-estratetraene-3,17β-diol is subjected to ionic reduction by triethylsilane and trifluoroacetic acid in the medium of an organic solvent followed by the isolation of the final product.

The thus-obtained racemic estradiol-3,17β finds application in medical practice as a pharmaceutical preparation in the treatment of genital disorders, and therapy of hormone-dependent tumors, as well as a component in contraceptive prescriptions.

5 Claims, No Drawings

METHOD OF PRODUCING RACEMIC ESTRADIOL-3,17β

The present invention relates generally to methods of producing steroid hormones, and more specifically to a method of producing racemic estradiol-3,17β which is used as a medicinal preparation for treatment of genital disorders, and for therapy of hormone-dependent tumors, as well as a component in contraceptive prescriptions.

A method of producing racemic estradiol-3,17β, is known wherein a solution of vinyl bromide is tetrahydrofuran is added to a suspension of metallic Mg in anhydrous tetrahydrofuran while cooling. Thereupon, the temperature of the mixture is raised to 20°C and it is boiled at 40°C; then the mixture is diluted with ether, cooled and a solution of 6-methoxytetralone in anhydrous tetrahydrofuran is added thereto. The mixture is stirred at 20°C for 1.5 hours, and held for 12 hours at 0°+2°C and during 2 hrs. After having been cooled down to +10°C the reaction mass is poured into a mixture of ice and ammonium chloride, the product thus obtained is extracted with ether, the extract is washed with water, dried, and the solvent is distilled off to obtain 1-vinyl-6-methoxytetralol-1. . The 1-vinyl-6-methoxytetralol-1 is condensed with 2-methylcyclopentane-1,3-dione by boiling in a methanol solution in the presence of sodium methylate as a catalyst, followed by extraction of 3-methoxy-$\Delta^{1,3,5(10),9(11)}$8,14-secoestratetraene-14-17-dione, washing of the extract with a 5-percent aqueous alkaline solution, evaporation of the solvent and crystallization. The product thus obtained is subjected to cyclization with toluenesulfonic acid by boiling in benzene, followed by washing with water, evaporation of the solvent and crystallization of the thus-obtained $\Delta^{8,14}$-bisdehydroestrone methyl ether; alternatively, the cyclization process may be carried out by using glacial acetic acid at room temperature with subsequent extraction of the final product, washing same with water, evaporation and crystallization of $\Delta^{8,14}$-bisdehydroestrone methyl ether.

The Δ8,14-bisdehydroestrone methyl ether is subjected to hydrogenation in tetrahydrofuran in the presence of a palladium catalyst to obtain $\Delta^{8(9)}$-dehydroestrone methyl ether which is reduced by alkali metals in liquid ammonia at a temperature of −50° to −60°C in tetrahydrofuran and ether, whereby estradiol-17β 3-methyl ether is produced.

The product thus obtained is oxidized with chromic anhydride in pyridine, whereupon the isolated estrone methyl ether is subjected to demethylation with pyridine bromohydrate at 220°–230°C to obtain estrone which is then reduced with lithium aluminum hydride in anhydrous tetrahydrofuran at 20°C, followed by extraction of the end product, evaporation of the solvent and crystallization of the final product, viz., estradiol-3,17β. The yield is 12–14 wt.% when calculated for 6-methoxytetralone (cf.USSR Author's Certificate No. 157056, journal "Khimia prirodnykh soedineniy" (Chemistry of Natural Compounds) (3), 172, 1965).

The above-discussed method, however, suffers from a number of disadvantages such as low yield of the final product, complicated technological process and equipment. Thus, the stage of demethylation with pyridine bromohydrate takes place at elevated temperatures (220°–230°C) which involves the use of appropriate equipment and apparatus. Besides, the maximum percentage of losses in the yield of the final product occurs at that stage.

Furthermore, the stage of reduction with alkali metals in liquid ammonia at −50° to −60°C requires special refrigeration equipment, large consumption of high-purity ammonia and inflammable solvents, such as ether and tetrahydrofuran, the yield at that stage being moderate amounting to 50 wt.%.

Another method of producing racemic estradiol-3,17β is known wherein a heterogeneous mixture of pyridine bromohydrate and 6-methoxytetralone is heated at 220°–225°C, then cooled, dissolved in a 10-percent hydrochloric acid and extracted with ether, whereupon the ethereal extract is washed with a saturated aqueous solution of sodium bicarbonate, dried, the solvent is distilled off and the residue is crystallized from water with the addition of sodium hydrosulfite. The thus-obtained 6-hydroxytetralone is treated with vinylmagnesiumbromide in a solution of anhydrous tetrahydrofuran and ether at −20°C, then is held for 12 hours at 0°C and boiled for 2 hours at 40°C. Then the reaction mass is cooled down to +10°C and poured into a mixture of ice and ammonium chloride, the organic layer is drawn off and the aqueous layer is extracted several times with ether. The extract having been washed, dried and concentrated the residue is washed with cold ether to obtain 1-vinyl-1,2,3,4-tetrahydronaphthalene-1,6-diol which is then condensed with 2-methylcyclopentane-1,3-dione in the presence of trimethylbenzylammonium, hydroxide as a catalyst while boiling in tertiary butanol for 1 hour. Then the obtained product is extracted with ether, the extract is washed with a saturated solution of sodium bicarbonate, dried, the solvent is evaporated the residue is washed with ether to $\Delta^{1,3,5(10),9(11)}$-8,14-secoestratetraen-3-ol-14,17-dione. The resultant product is treated with hydrochloric acid at a ratio of 1:1 in tetrahydrofuran at 20°C for 12 hours, with subsequent extraction with ether, washing with a saturated aqueous solution of sodium bicarbonate and then with water, drying, evaporation of the solvent and crystallization of the obtained product, viz., $\Delta^{1,3,5,(10),8(9),14(15)}$-estrapenten-3-ol-17-one.

The isolated product is hydrogenated with gaseous hydrogen in a solution of tetrahydrofuran over a 10-percent palladium on calcium carbonate. Upon filtration, solvent evaporation and crystallization of the residue, an intermediate product is obtained, viz., $\Delta^{1,3,5(10),8(9)}$-estratetraen- 3-ol-17-one; which is then isomerized with hydrochloric acid (1:1) in tetrahydrofuran solution for 1 hour. The reaction mass is neutralized with a saturated aqueous solution of sodium bicarbonate, extracted with chloroform, washed with water, dried concentrated and crystallized from methanol to obtain $\Delta^{1,3,5(10),9(11)}$-estratetraen-3-ol-17-one. The product obtained is hydrogenated with gaseous hydrogen in tetrahydrofuran over 10-percent palladium on calcium carbonate, the catalyst is filtrated off, the solvent is evaporated the residue is crystallized to obtain racemic estrone. Further, estrone is reduced with sodium borohydride or lithium aluminum hydride and, by resorting to conventional techniques, racemic estradiol-3,17β is isolated. The yield of the final product is 4–5 wt.% as calculated for 6-methoxytetralone /cf.Steroids, 4(1), 31 (1964)/.

A disadvantage inherent in the above method is the low yield of the final product. Another disadvantage of this method resides in that the stage of demethylation with pyridine bromohydrate is carried out at a high temperature (220°C) which involves special equipment, the yield at that stage being unstable. Besides, when utilizing starting substances in amounts exceeding 5 g the yield decreases and cannot be duplicated so that the process is difficult to carry out under plant-production conditions. The stage of producing 1-vinyl-1,2,3,4,-tetrahydronaphthalene-1,6-diol occurs at a low temperature (−20°), its yield being not in excess of 70 wt.%.

The stage of acid isomerization of $\Delta^{1,3,5,(10),8(9)}$-estratetraen-3-ol-17-one into $\Delta^{1,3,5(10),9(11)}$-estratetraen-3-ol-17-one is difficult due to nearly equal solubility of both; thus, to isolate the latter a thorough triple crystallization is needed till a constant melting point of the product is obtained. The yield at that stage is about 36 wt.%. Apart from everything discussed above, one more disadvantage of the method lies in the necessity of the stage of catalytic hydrogenation, this stage being inadequately stereospecific, and the yield of estrone being as low as 50–55 wt.%.

It is a primary object of the present invention to increase the yield of the final product.

It is another object of the present invention to simplify the process.

Said primary and other objects of the invention have been attained due to the provision of a method of producing racemic estradiol-3,17β by demethylation of 6-methoxytetralone; interaction of the resultant 6-hydroxytetralone with vinylmagnesiumbromide; condensation of the thus-formed 1-vinyl-1,2,3,4-tetrahydronaphthalene-1,6-diol with 2-methylcyclopentane-1,3-dione; cyclization of the obtained $\Delta^{1,3,5(10),9(11)}$-8,14-seco-estratetraen-3-ol-14,17-dione; hydrogenation of the above product; and reduction of $\Delta^{1,3,5(10),8(9)}$-estratetraen-3-ol-17-one resulting from the above hydrogenation, into the final product, in which method, according to the invention, demethylation of 6-methoxytetralone is effected by hydrobromic acid in boiling acetic acid, whereas the process of reduction of $\Delta^{1,3,5(10),8(9)}$-estratetraen-3-ol-17-one is carried out by sodium borohydride with subsequent ionic reduction of the thus-obtained $\Delta^{1,3,5(10),8(9)}$-estratetraene-3,17β-diol by triethylsilane and trifluoroacetic acid in an organic solvent and isolation of the final product.

It is expedient that benzene be used as an organic solvent in the ionic reduction process.

It is preferable to carry out the ionic reduction process at a molar ratio between $\Delta^{1,3,5(10),8(9)}$-estratetraene-3,17 -diol triethylsilane and trifluoroacetic acid equal to 1:20:20.

To increase the yield of the end product the reaction of 6-oxytetralone with vinylmagnesiumbromide proceeds at 18°–20°C. The final product is preferably isolated by extraction with benzene from the reaction mass, concentrating the resulting extract; treatment with sodium borohydride in methanol at 40°–45°C, then with acetic acid when cooled and separation of the crystallized final product.

The herein-proposed method is carried out as follows.

6-methoxytetralone is demethylated by being boiled in a mixture of glacial acetic acid with 48-percent hydrobromic acid. The resulting product is extracted with ethyl acetate, washed and concentrated to obtain 6-hydroxytetralone which is treated with vinylmagnesiumbromide in a solution of tetrahydrofuran and ether at 20°C and then boiling the mixture at 40°C. Then the reaction mass is cooled down to +10°C and poured into a mixture of ice and ammonium chloride, whereupon the resultant 1-vinyl-1,2,3,4-tetrahydronaphthalene-1,6-diol is extracted with ether and the solvent is distilled off.

The thus-produced 1-vinyl-1,2,3,4-tetrahydronaphthalene-1,6-diol is condensed with 2-methylcyclopentane-1,3-dione and the resultant $\Delta^{1,3,5(10),9(11)}$-8,14-seco-estratetraen-3-ol-14,17-dione is subjected to cyclization followed by hydrogenation and isolation of $\Delta^{1,3,5(9),8(9)}$-estratetraen-3-ol-17-one.

The isolated product is reduced with sodium borohydride in a 5-percent methanol solution of potassium hydroxide at 0°+5°C, the mixture is neutralized and extracted with ethyl acetate, the solvent is evaporated, and the residue is crystallized to obtain $\Delta^{1,3,5(10),8(9)}$-estratetraene-3,17β-diol. The latter is subjected to ionic reduction with a mixture of trifluoroacetic acid and triethylsilane in an organic solvent (methylene chloride, benzene, etc.) at 20°C.

The reaction mixture is poured by portions into ice, extracted with benzene, the extract is washed with a 5-percent aqueous solution of sodium bicarbonate and with water and concentrated. The residue is treated with sodium borohydride in methanol at 40°C, the mixture is poured into a 5-percent acetic acid solution while cooling and the thus crystallized racemic estradoil-3,17β is filtered off.

The yield of the final product is 30 wt.% as calculated for 6-methoxytetralone.

The proposed method enables the technological process to be simplified. The stage of demethylation proceeds in a homogeneous medium which makes it possible to increase the yield to 98 wt.% at that stage and dispense with complicated technological equipment and apparatus. The stage of producing 1-vinyl-1,2,3,4-tetrahydronaphthalene-1,6-diol takes place at room temperature. Instead of the isomerization stage which gives but a low yeild, and the stage of catalytic hydrogenation made use of in the known method, the method of the invention employs the stage of ionic reduction with trifluoroacetic acid in a mixture with triethylsilane.

Due to simplification of a number of technological operations the yield of the final product is increased to 30 wt.% as calculated for 6-methoxytetralone, as compared to 5–20 wt.% in the heretofore known methods.

To promote understanding of the present invention the following is an exemplary embodiment thereof illustrating the production of racemic estradiol-3,17β by the method of the invention.

A solution of 62 g of 6-methoxytetralone in a mixture of 435 ml of glacial acetic acid and 185 ml of 48-percent hydrobromic acid, is boiled for 10 hours. Then the solution is concentrated in vacuo to one-third of the initial volume and poured into 1.5 litres of water, whereupon the obtained product is extracted with ethyl acetate. The extract is washed with a saturated aqueous solution of sodium bicarbonate and with water, dried and evaporated. The residue is washed with cold water and air-dried to obtain 56.5 g of 6-hydroxytetralone with a m.p. of 149°–153°C, the yield thereof being 98 wt.% of the theoretical.

To a mixture of 36.5 g of metallic magnesium chips and 150 ml of anhydrous tetrahydrofuran a few drops of methyl bromide are added whereupon the mixture is heated till the reaction begins. Then, while stirring and cooling down to 0°+5°C, 229 g of vinylbromide dissolved in 450 ml of anhydrous tetrahydrofuran are added dropwise to the mixture, maintaining its slow boiling. This done, the temperature of the reaction mixture is elevated first to 20°C, whereupon the mixture is kept boiling for 1 hour at +40°C. Then the mixture is diluted with 500 ml of absolute ether followed by the dropwise addition at 20°C of 56.5 g of 6-oxytetralone in anhydrous tetrahydrofuran under vigorous stirring. The mixture obtained is diluted with 200 ml of anhydrous tetrahydrofuran and 100 ml of absolute ether, allowed to stand for 12 hours and boiled for 2 hours. The resultant reaction mixture is cooled down to +10°C and poured by portions into a mixture of 2 kg of ice and 100 g of ammonium chloride. The organic layer is separated, while the aqueous one is thrice extracted with ether (about 2 liters). The combined extract is washed with a saturated sodium hyposulfhite solution and evaporated in vacuo at 30°–35°C. The residue is washed with cold ether to obtain 60 g of 1-vinyl-1,2,3,4-tetrahydronaphthalene-1,6-diol, m.p. 200°C with decomposition, the yield being 90 wt.% of the theoretical.

To 800 mg of the thus-obtained 1-vinyl-1,2,3,4-tetrahydronaphthalene-1,6-diol and 800 mg of 2-methylcyclopentane-1,3-dione dissolved in 7 ml of tert-butanol, is added 1 ml of a saturated alcoholic solution of trimethylbenzyl ammonium hydroxide resulting from mixing alcoholic solutions of equimolar quantities of trimethylbenzylammoniumhydrochloride and potassium hydroxide, followed by filtering off the potassium chloride and cencentrating the solvent to a volume of 1 ml. The reaction mixture is boiled 1 hour, diluted with half-volume of ether, washed with a saturated sodium bicarbonate solution and water, dried and evaporated. The residue is washed with cold ether to obtain 970 mg of $\Delta^{1,3,5(10),9(11)}$-8,14-seco-estratraen-3-ol-14,17-dione, m.p. of 122°–124°C, the yield being 80 wt.% of the theoretical.

970 mg of the thus-obtained $\Delta^{1,3,5(10),9(11)}$-8,14-seco-estratetraen-3-ol-14,17-dione are dissolved in 14 ml of tetrahydrofuran containing 3 ml of hydrochloric acid (1:1), and allowed to stand for 12 hours at 20°C, then extracted with ether. The extract is washed with a saturated aqueous solution of sodium bicarbonate and with water, dried with anhydrous magnesium sulfate and evaporated. Upon crystallization of the residue from a methanolethyl acetate mixture (1:1), 750 mg of $\Delta^{1,3,5,8(9),14(15)}$-estrapentaen-3-ol-17-one, m.p. of 213°–218°C were obtained, the yield being 82 wt.% of the theoretical.

750 mg of $\Delta^{1,3,5,8(9),14(15)}$-estrapentaen-3-ol-17-one dissolved in 25 ml of tetrahydrofuran, are hydrogenated per double bond over 10-percent palladium on calcium carbonate. The solution is filtered from the catalyst, the filtrate is evaporated and the residue is crystallized from methanol to obtain 630 mg of $\Delta^{1,3,5(10),8(9)}$-estratetraen-3-ol17-one, m.p. of 242°–246°C, with a yeild of 83 wt.% of the theoretical.

To a solution of 630 mg of $\Delta^{1,3,5,8(9)}$-estratetraen-3-ol-17-one in 5 ml of a 5-percent methanol solution of potassium hydroxide is added dropwise a solution of 0.2 g of sodium borohydride in 3 ml of a 5-percent methanol solution of potassium hydroxide. The resulting solution is stirred for 3.5 hours at 0°+5°C. Then the mixture is poured into water, neutralized with 2-percent hydrochloric acid, extracted with ether and then with ethyl acetate. The extract is washed with water, dried with anhydrous magnesium sulfate and evaporated in vacuo. The residue is crystallized from 90-percent aqueous methanol to obtain 500 mg of $\Delta^{1,3,5,8(9)}$-estratetraene-3,17β-diol, m.p. of 120°/205°–212°C, the yield being 80 wt.% of the theoretical.

To 500 mg of $\Delta^{1,3,5,8(9)}$-estratetraene-3,17β-diol dissolved in 25 ml of absolute benzene 5 ml of triethylsilane and 2.4 ml of trifluoroacetic acid are added at 30°C and the mixture is allowed to stand for 3 hours at 20°C. Then the mixture is poured dropwise onto ice and extracted with benzene. The extract is washed with a 5-percent aqueous solution of sodium bicarbonate, then with water and evaporated. To the residue dissolved in 40 ml of methanol, 1 g of sodium borohydride in 24 ml of methanol is added and the mixture is stirred 2 hours at 40°–45°C. The mixture is poured into 24 ml of a 5-percent acetic acid (pH=3.5) with ice-cooling. The precipitate is filtered, washed with water and air-dried to obtain 450 mg of d,l-estradiol-3,17β, m.p. of 178°–182°C, similar to a sample obtained by another method. The yield is equal to 82 wt.% of the theoretical and 30 wt.% as calculated for the starting substance, viz., 6-methoxytetralone.

What we claim is:

1. A method of producing racemic estradiol-3,17β comprising the steps of (1) boiling 6-methoxytetralone with hydrobromic acid in acetic acid to form 6-hydroxytetralone, (2) reacting said 6-hydroxytetralone with vinylmagnesium bromide to form 1-vinyl-1,2,3,4-tetrahydronapthalene-1,6-diol, (3) condensing said 1-vinyl-1,2,3,4-tetrahydronaphthalene-1,6diol with 2-methyl-cyclopentene-1,3-dione to form $\Delta^{1,3,5(10),9(11)}$-8,14-seco-estratetraen-3-ol-14,17-dione, (4) cyclizing said $\Delta^{1,3,5(10),9(11)}$-8,14-secoestratetraen-3-ol-14,17-dione to form $\Delta^{1,3,5(10),8(9),14(15)}$-estrapentaen-3-ol-17-one, (5) hydrogenating said $\Delta^{1,3,5(10),8(9),14(15)}$-estrapentaene-3-ol-17-one to form $\Delta^{1,3,5(10),8(9)}$-estratetraen-3-ol-17-one, (6) reducing said $\Delta^{1,3,5(10),8(9)}$-estratetraen-3-ol-17-one to form $\Delta^{1,3,5(10),8(9)}$-estratetraene-3,17β-diol, (7) ionically reducing said $\Delta^{1,3,5(10),8(9)}$-estratetraene-3,17β-diol with triethylsilane and trifluoroacetic acid in an organic solvent to form estradiol -3,17β and (8) isolating said estradiol-3,17β.

2. A method according to claim 1 wherein the organic solvent in step (7) is benzene.

3. A method according to claim 1 wherein the molar ratio of $\Delta^{1,3,5(10),8(9)}$-estratetraene-3,17β-diol to triethylsilane to trifluoroacetic acid is 1:20:20.

4. A method according to claim 1 wherein step (2) is carried out at 18°–20°C.

5. A method according to claim 1 wherein step (8) comprises extracting said estradiol-3,17β from the reaction mixture with benzene, evaporating the benzene extract to form a residue, treating said residue with sodium borohydride in methanol at 40°–45° C. and then with acetic acid with cooling, and separating the crystallized estradiol-3,17β.

* * * * *